United States Patent
Ee

(10) Patent No.: US 10,937,452 B2
(45) Date of Patent: Mar. 2, 2021

(54) DISK DRIVE SUSPENSION CONFIGURED FOR VERTICAL COUPLING AND WINDAGE CONTROL

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 16/359,760

(22) Filed: Mar. 20, 2019

(65) Prior Publication Data

US 2019/0318762 A1   Oct. 17, 2019

Related U.S. Application Data

(60) Provisional application No. 62/656,255, filed on Apr. 11, 2018.

(51) Int. Cl.
 *G11B 5/48* (2006.01)

(52) U.S. Cl.
 CPC ............ *G11B 5/484* (2013.01); *G11B 5/4873* (2013.01)

(58) Field of Classification Search
 CPC ....... G11B 5/4873; G11B 5/483; G11B 5/486; G11B 5/484
 See application file for complete search history.

(56) References Cited

U.S. PATENT DOCUMENTS

| | | | | |
|---|---|---|---|---|
| 6,002,549 A | * | 12/1999 | Berman | B24B 37/048 360/294.4 |
| 6,052,251 A | * | 4/2000 | Mohajerani | G11B 5/54 360/294.4 |
| 6,157,522 A | * | 12/2000 | Murphy | G11B 5/5552 360/294.4 |
| 6,331,923 B1 | * | 12/2001 | Mei | G11B 5/5552 360/294.4 |
| 6,501,625 B1 | | 12/2002 | Boismier et al. | |
| 6,661,619 B2 | * | 12/2003 | Nishida | G11B 5/5552 360/294.4 |
| 6,731,472 B2 | * | 5/2004 | Okamoto | G11B 21/025 360/244.5 |
| 6,760,181 B2 | | 7/2004 | Li et al. | |
| 6,894,876 B1 | * | 5/2005 | Coon | G11B 5/4826 360/294.4 |
| 7,016,159 B1 | * | 3/2006 | Bjorstrom | G11B 5/4833 360/294.6 |
| 7,038,888 B2 | * | 5/2006 | Ma | G11B 5/5552 360/294.4 |

(Continued)

*Primary Examiner* — Brian E Miller
(74) *Attorney, Agent, or Firm* — DLA Piper LLP (US)

(57) ABSTRACT

A suspension assembly is described. The suspension assembly includes a load beam, the load beam includes a first set of spring extensions connecting a rigid region and a mounting region of the load beam. The suspension assembly also includes a base plate coupled to the mounting region of the load beam. The base plate includes two hinge members, each of the hinge members includes a second spring extension connected to the first set of spring extensions and coupling the load beam and the base plate. The base plate also includes a bender on a first side of the load beam connected to one of the two hinge members predisposing the rigid region to move from a first position to a second position.

21 Claims, 4 Drawing Sheets

(56) References Cited

U.S. PATENT DOCUMENTS

| | | | | |
|---|---|---|---|---|
| 7,177,119 B1* | 2/2007 | Bennin | G11B 5/4833 | 360/294.6 |
| 7,280,316 B1 | 10/2007 | McCaslin et al. | | |
| 7,280,319 B1* | 10/2007 | McNab | G11B 5/4826 | 360/294.4 |
| 7,573,680 B1* | 8/2009 | Kulangara | G11B 5/4833 | 360/244.8 |
| 7,757,379 B1 | 7/2010 | McCaslin et al. | | |
| 7,872,834 B1* | 1/2011 | Pokornowski | G11B 5/4873 | 360/244.8 |
| 8,228,642 B1* | 7/2012 | Hahn | G11B 5/4873 | 360/244.5 |
| 8,254,062 B2 | 8/2012 | Greminger | G11B 5/4833 | 360/244.5 |
| 8,335,055 B2* | 12/2012 | Hanya | G11B 5/4873 | 360/294.4 |
| 8,400,737 B2* | 3/2013 | Hong | G11B 5/4826 | 360/244.8 |
| 8,416,536 B2* | 4/2013 | Fuchino | G11B 5/4833 | 360/244.8 |
| 8,432,642 B2* | 4/2013 | Fujimoto | G11B 5/4873 | 360/244.8 |
| 8,559,137 B2* | 10/2013 | Imuta | H01L 41/053 | 360/294.4 |
| 8,559,138 B1* | 10/2013 | Hahn | G11B 5/4873 | 360/244.5 |
| 8,570,688 B1* | 10/2013 | Hahn | G11B 5/4873 | 360/294.4 |
| 8,717,713 B1* | 5/2014 | Bjorstrom | G11B 5/4873 | 360/244.8 |
| 8,995,092 B2* | 3/2015 | Yonekura | G11B 5/483 | 360/244.5 |
| 2001/0043443 A1* | 11/2001 | Okamoto | G11B 21/025 | 360/294 |
| 2004/0021989 A1* | 2/2004 | Ma | G11B 5/5552 | 360/294.4 |
| 2004/0032686 A1 | 2/2004 | Koganezawa | | |
| 2005/0030670 A1* | 2/2005 | Ando | G11B 5/486 | 360/244.8 |
| 2010/0067151 A1* | 3/2010 | Okawara | G11B 5/4846 | 360/294 |
| 2010/0097726 A1* | 4/2010 | Greminger | G11B 5/4833 | 360/294.4 |
| 2010/0208390 A1* | 8/2010 | Hanya | G11B 5/4873 | 360/245.2 |
| 2010/0271729 A1* | 10/2010 | Hong | G11B 5/4873 | 360/55 |
| 2011/0058280 A1* | 3/2011 | Hanya | G11B 5/4833 | 360/244.5 |
| 2011/0211274 A1* | 9/2011 | Kuwajima | G11B 5/4833 | 360/71 |
| 2011/0242708 A1* | 10/2011 | Fuchino | G11B 5/4806 | 360/294.3 |
| 2013/0301164 A1* | 11/2013 | Nishida | G11B 5/48 | 360/244.7 |
| 2015/0162033 A1* | 6/2015 | Miller | G11B 5/4833 | 360/244.8 |

* cited by examiner

DISK DRIVE SUSPENSION CONFIGURED FOR VERTICAL COUPLING AND WINDAGE CONTROL

CROSS-REFERENCE TO RELATED APPLICATIONS

This application claims priority from U.S. Provisional Patent Application No. 62/656,255, filed on Apr. 11, 2018, which is hereby incorporated by reference in its entirety.

FIELD

Embodiments of the invention relate to the field of hard disk drive suspensions. More particularly, embodiments of the invention related to hard disk drive suspensions configured to compensate for flow induced disk vibrations, commonly called disk flutter.

BACKGROUND

A hard disk drive (HDD) unit generally uses a spinning storage medium (e.g., a disk or platter) to store data. A read-write head is positioned in close proximity to the spinning storage medium by a head stack assembly (HSA). Mounted on the HSA, a suspension assembly commonly includes a base plate, a load beam, and a flexure trace gimbal to which a slider is mounted. The slider supports the read-write head element. The load beam is generally composed of an actuator mounting region, a spring region, and a rigid region. The spring region gives the suspension a spring force or preload to counteract the aerodynamic lift force created by the spinning storage medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the track center. Problems associated with disk flutter become more intolerable with higher track densities and disk rotation speeds.

Accordingly, novel solutions for operating hard disk drives to substantially reduce off-track misalignment induce by disk flutter are needed.

SUMMARY

The present disclosure provides a suspension assembly. The suspension assembly includes a load beam, the load beam includes a first set of spring extensions connecting a rigid region and a mounting region of the load beam. The suspension assembly also includes a base plate coupled to the mounting region of the load beam. The base plate includes two hinge members, each of the hinge members includes a second spring extension connected to the first set of spring extensions and coupling the load beam and the base plate. The base plate also includes a bender on a first side connected to one of the two hinge members predisposing the rigid region to move from a first position to a second position.

According to some embodiments, the first side and the second side of the suspension assembly are asymmetric. The first and second set of spring extensions can extend lengthwise in a range of about 400 microns to about 1000 microns. For some embodiments, the first and second set of spring extensions are of equal length. Furthermore, the first and second set of spring extensions can each be orientated at about a 0° roll angle with respect to a plane defined by a platter, whereby an operating attitude of the load beam is substantially at a 0° roll angle. For some embodiments, the hinge member includes a spring metal layer configured to provide a spring relationship between load beam and base plate. For some embodiments, the bender includes lead zirconate titanate. For other embodiments, the bender comprises piezoelectric material. The bender can include a 4-layer PZT with a total thickness of 60 microns. According to some embodiments, the second set of spring extensions can be coupled to the first set of spring extensions by way of laser spot welding. The load beam can include at least one rail formed along a majority of a length of the support section to provide increased stiffness to the support section.

The present disclosure provides a hard disk apparatus. The hard disk apparatus can include a load beam, the load beam includes a first set of spring extensions connecting a rigid region and a mounting region of the load beam. The hard disk apparatus can include a base plate coupled to the mounting region of the load beam. Furthermore, the hard disk apparatus can also include two hinge members, where each of the hinge members includes a second spring extension connected to the first set of spring extensions and coupling the load beam and the base plate. The hard disk apparatus can also include a bender on a first side of the load beam connected to one of the two hinge members predisposing the rigid region to move from a first position to a second position in response to a disk flutter. The hard disk apparatus can include a gimbal coupled to the load beam, a read/write head coupled to the gimbal, and a rotating platter disposed away from the load beam in the first direction. The first direction can be perpendicular to the rotating platter.

The first and second set of spring extensions can each be orientated at about a 0° roll angle with respect to a plane defined by the rotating platter, whereby an operating attitude of the load beam is substantially at a 0° roll angle. The first and second spring extensions prior to pre-load forming can each be flat and orientated at about a 0° roll angle. A rotational speed of the platter can be greater than about 5,000 rpm.

BRIEF DESCRIPTION OF THE DRAWINGS

In order to describe the manner in which the advantages and features of the disclosure can be obtained. Embodiments of the present disclosure are described with reference to specific examples illustrated in the appended drawings. These drawings depict only example aspects of embodiments of the present disclosure, and are therefore not to be considered as limiting of its scope. The principles are described and explained with additional specificity and detail through the use of the following drawings.

DETAILED DESCRIPTION

Figure 1:
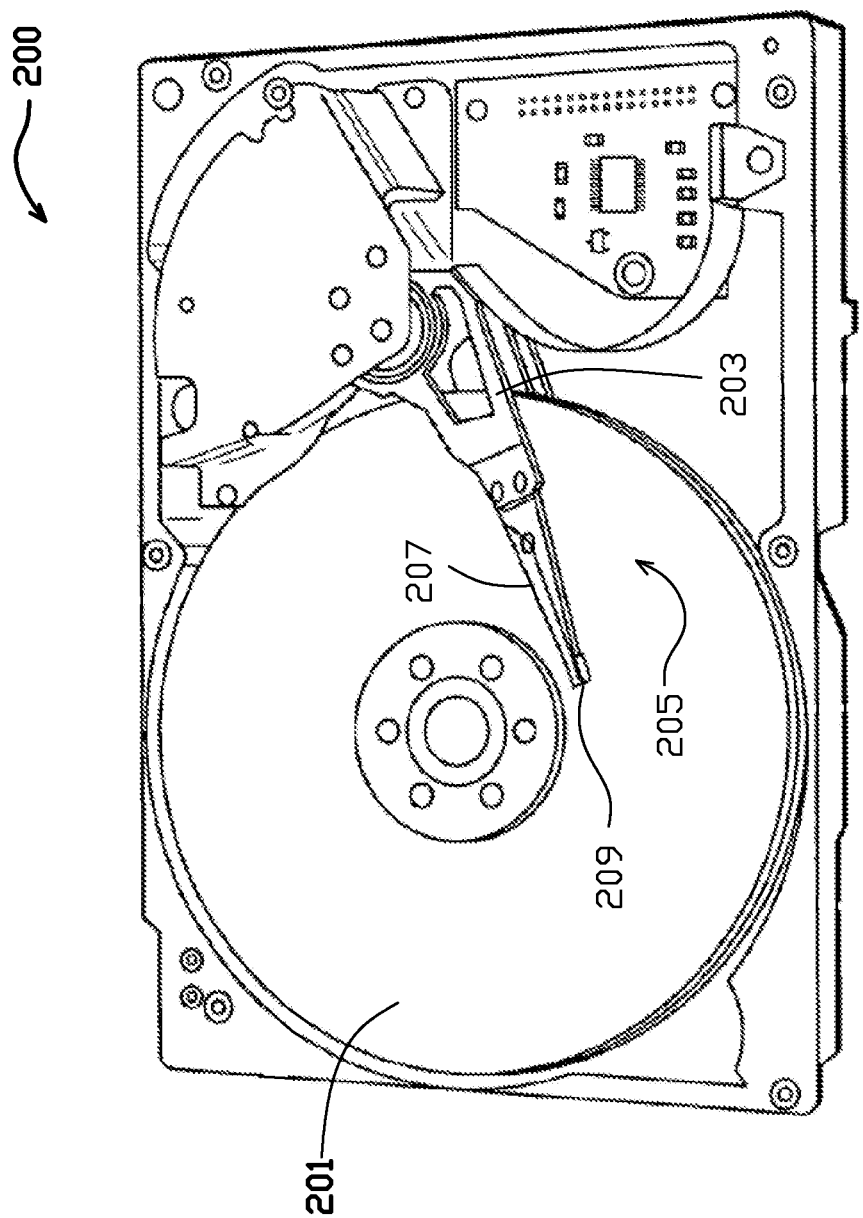
FIG. 1 illustrates a simplified diagram of a disk drive apparatus.

Techniques for operating a disk drive apparatus are provided. More particularly, embodiments of the present invention provide a method and apparatus for reading and writing information onto a hard disk drive that compensate for flow induced vibrations. Merely by way of example, the present invention is implemented using such method and apparatus with a piezoelectric microactuator (PZT) at a baseplate region functioning as a bender to create an offset as needed for vertical coupling.

The embodiments of the present disclosure are described with reference to the attached figures, wherein like reference numerals are used throughout the figures to designate similar or equivalent elements. The figures are not drawn to scale, and they are provided merely to illustrate the instant invention. Several aspects of the embodiments are described below with reference to example applications for illustration. It should be understood that numerous specific details, relationships, and methods are set forth to provide a full understanding of the embodiments. One having ordinary skill in the relevant art, however, will readily recognize that the invention can be practiced without one or more of the specific details, or with other methods. In other instances, well-known structures or operations are not shown in detail to avoid obscuring the embodiments. Embodiments of the present disclosure are not limited by the illustrated ordering of acts or events, as some acts may occur in different orders and/or concurrently with other acts or events. Furthermore, not all illustrated acts or events are required to implement a methodology in accordance with the present invention.

Embodiments of the present disclosure are directed to a suspension assembly. The suspension assembly includes a load beam, the load beam includes a first set of spring extensions connecting a rigid region and a mounting region of the load beam. The suspension assembly also includes a base plate coupled to the mounting region of the load beam. The base plate includes two hinge members, each of the hinge members includes a second spring extension connected to the first set of spring extensions and coupling the load beam and the base plate. The base plate also includes a bender on a first side connected to one of the two hinge members predisposing the rigid region to move from a first position to a second position in response to a disk flutter.

FIG. 1 is a simplified diagram of a disk drive apparatus 200 according to an embodiment of the present disclosure. Apparatus 200 includes at least one disk 201 (e.g., one, two, three, or more disks), at least one actuator arm 203 (e.g., one, two, three, or more actuator arms), and at least one suspension assembly 205 (e.g., one, two, three, or more suspension assemblies). Each suspension assembly includes a load beam 207, with spring extensions, and a flexure trace gimbal assembly 209. The first and second set of spring extensions are disposed apart by an offset using benders. The suspension assembly, with trace gimbal assembly and read/write head, may be referred to as a head gimbal assembly (HGA). This diagram, as well as other diagrams provided herein, is merely an example, which should not unduly limit the scope of the claims herein. One of ordinary skill in the art would recognize many other variations, modifications, and alternatives.

Disk 201, commonly called a platter, rotates about a fixed axis (or spindle) from about 5,000 rpm up to about 15,000 rpm depending upon the embodiment. The disk 201 stores information and thus often includes a magnetic medium such as a ferromagnetic material. But, it can also include optical materials, common coated on surfaces of the disk, which become active regions for storing digital bit information. The aggregate storage capacity of disk 201 will vary with track density and disk diameter. The disk 201 stores information in tracks which can be in a range of about 50,000 tracks per inch (TPI) to about 200,000 TPI, or more. The diameter of disk 201 can be 5.12 inches (e.g., for a 5.25-inch drive), 3.74 inches (e.g., for a 3.5 inch drive), or less than 2.5 inches, or even less than 1.8 inches or 1.0 inch.

The suspension assembly 205, which overlies (or underlies) a surface of disk 201, operates and controls a slider coupled to a read/write head (not shown). Flexure trace gimbal assembly 209 is attached to load beam 207 which is in turn is connected to an actuator arm 203. The actuator arm 203 can be connected to a voice coil motor or VCM, which moves the suspension assembly 205 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Figure 2A:
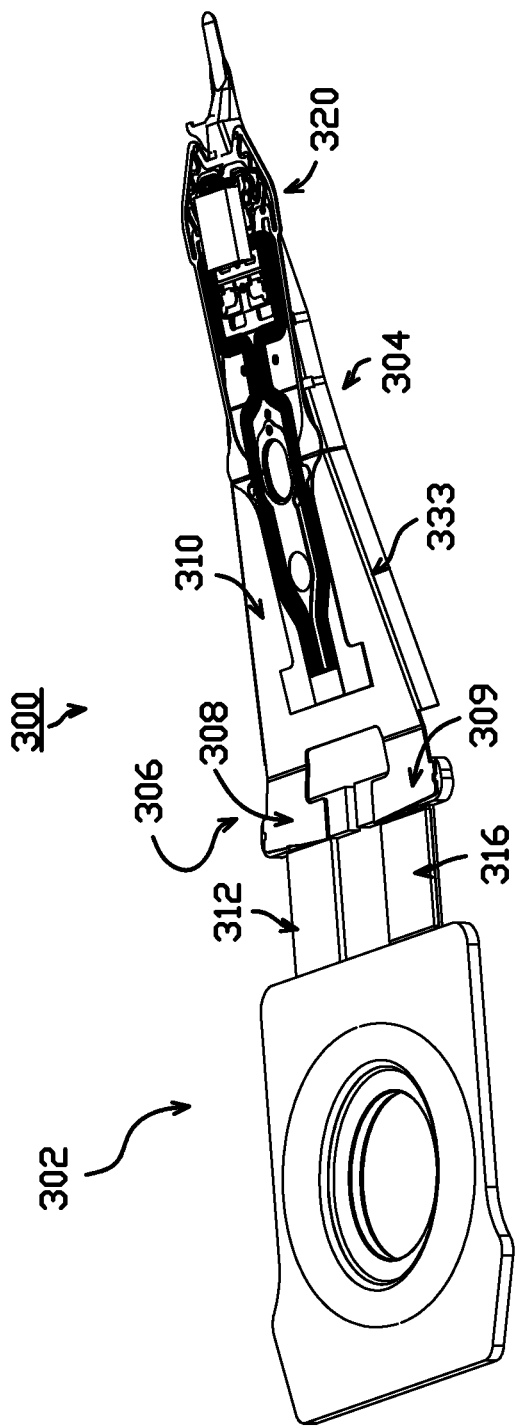
FIG. 2A illustrates a simplified view of a suspension assembly, according to an embodiment of the present disclosure.
Figure 2B:
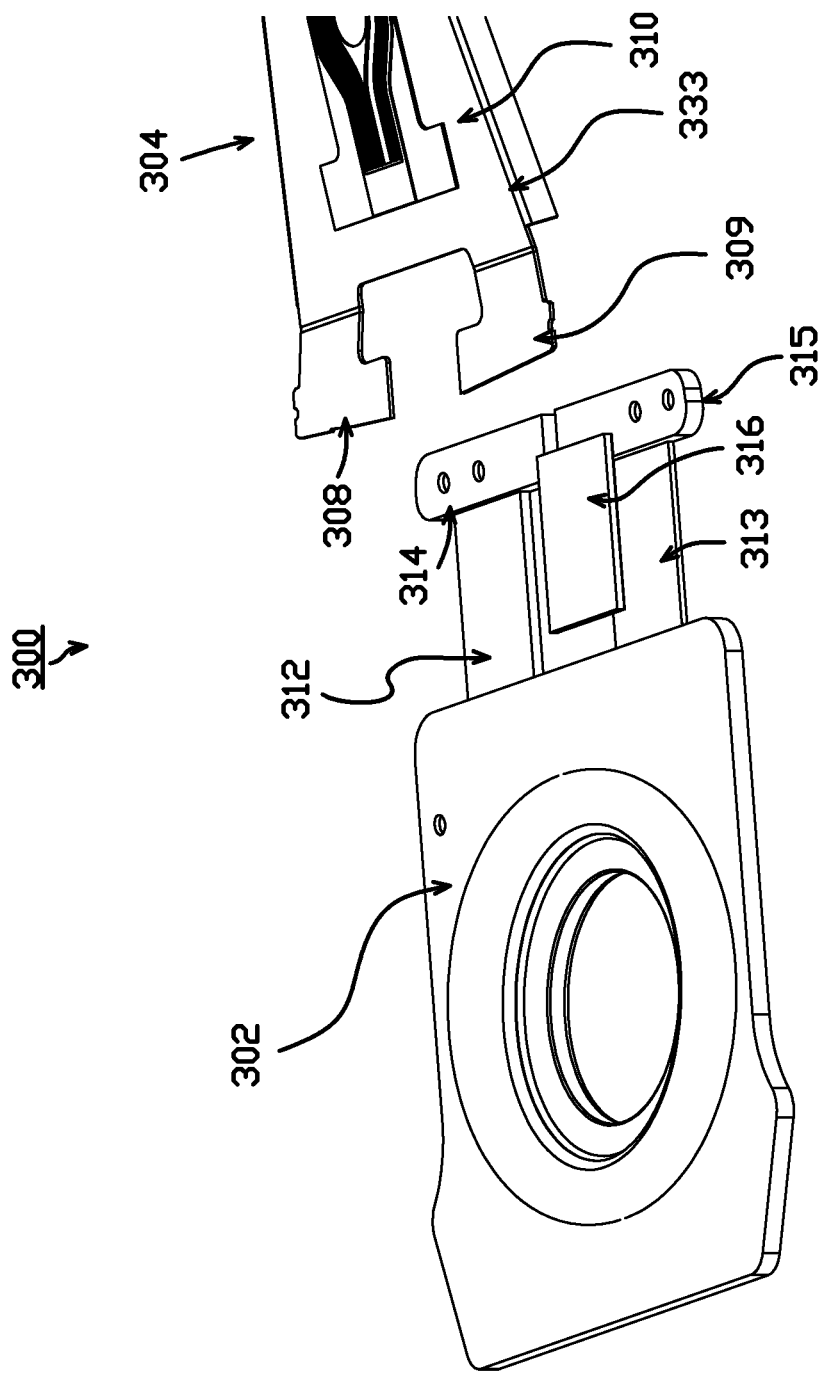
FIG. 2B illustrates an exploded view of a suspension assembly, according to an embodiment of the present disclosure.

FIGS. 2A and 2B are simplified views of a suspension assembly 300 according to an embodiment of the present disclosure. These diagrams are merely examples, which should not unduly limit the scope of the claims herein. One of ordinary skill in the art would recognize other variations, modifications, and alternatives.

The suspension assembly 300 includes a base plate 302, load beam 304, at least one hinge member 312, a bender, such as a piezoelectric bender (PZT) 316, and flexure trace gimbal assembly 320. The load beam 304 includes a mounting region 306. The mounting region 306 can include a first set of spring extensions 308 and 309 connected to a rigid region 310 of the load beam 304. The hinge member 312 includes a second set of spring extensions 314 and 315 for coupling the base plate 302 and the load beam 304.

The second set of spring extensions 314 and 315 can be coupled to the first set of spring extensions 308 and 309, typically by way of laser spot welding. There can be one or more intermediate layers between coupled second set of spring extensions 314 and 315 and the first set of spring extensions 308 and 309, such as a layer of epoxy. The load beam 304 can also include edge rails 333 along a length of the rigid region 310. Edge rails 333 provide stiffness to the load beam 304. In alternative embodiments, the load beam may be configured without edge rails 333.

The first and second set of spring extensions 308-309 and 314-315 provide the suspension assembly 300 with a spring force or preload to counteract the aerodynamic lift force created by a spinning medium during reading or writing to an HDD. The first and second set of spring extensions 308-309 and 314-315 can extend lengthwise in a range of about 300 microns to about 1000 microns. Preferably, but not necessarily, spring extensions 308-309 and 314-315 are of equal length. Additionally, in the absence of disk vibrations, the first and second set of spring extensions 308-309 and 314-315 are substantially oriented with a 0° roll angle, or about a 0° roll angle, with respect to a plane defined by a disk or platter. Thus, an operating attitude of the load beam 304 is substantially at a 0° roll angle. The hinge member 312 can be comprised of a springing metal layer or any other material providing a suitable spring relationship between load beam 304 and base plate 302. Extra material can be added to the hinge member 312 in contact with mounting region 306.

As shown in FIG. 2A, the bender 316 can be disposed opposite the hinge member 312 connecting the load beam 304 and base plate 302. The piezoelectric bender 316 provides a vertical offset between the first and second set of spring extensions 308-309 and 314-315. According to some embodiments, a piezoelectric bender 316 is used on a single side of the gap between the load beam 304 and base plate 302 so that second set of spring extensions 314 and 315 is level and parallel to the first set of spring extension 308 and 309. However, it should be understood by one of ordinary skill in the art that the piezoelectric bender 316 can be disposed on a hinge member 312, as shown in FIG. 2B.

The piezoelectric bender 316 can be comprised of lead zirconate titanate (PZT). It should be understood by one of ordinary skill in the art, that other piezoelectric materials can also be used. Referring momentarily to FIG. 1, when the suspension assembly 205 is at region closer to the outer diameter of the disk 201 (where disk flutter is most severe), a DC voltage can be applied to the piezoelectric bender 316 to bend a section of the baseplate tip downward in order to have an asymmetry geometry that will result in vertical coupling with the surface of the disk. When the suspension assembly 205 is near inner diameter area of the disk 201, zero DC voltage on the piezoelectric bender 316 will bring the tip back to its original position and the hinge region will become symmetrical again. Thus, the resonance modes such as the first bending mode, second bending mode, etc. and its associated windage modes that are sensitive to asymmetry of suspension can be minimized.

Referring back to FIG. 2A, the piezoelectric bender 316 can be positioned opposite the hinge member 312, creating the hinge vertical offset as needed when PZT actuation bends one side of the hinge in a vertical direction. This will result in vertical coupling needed to cancel the off-track movement during disk flutter.

As shown in FIG. 2B, hinge member 312 is designed to balance with the stiffness and mass distribution of the combined piezoelectric bender 316 and the second hinge member 313. A balanced design between hinge member 312, the combined bender 316, and the second hinge member 313, or the portion that is disposed beyond the first and second set of spring extensions, results in near zero roll angle when the suspension is loaded on the disk when there is no voltage applied to the bender. The suspension then will have similar performance as conventional design in which the bending mode resonances and windage are minimized.

Figure 3:
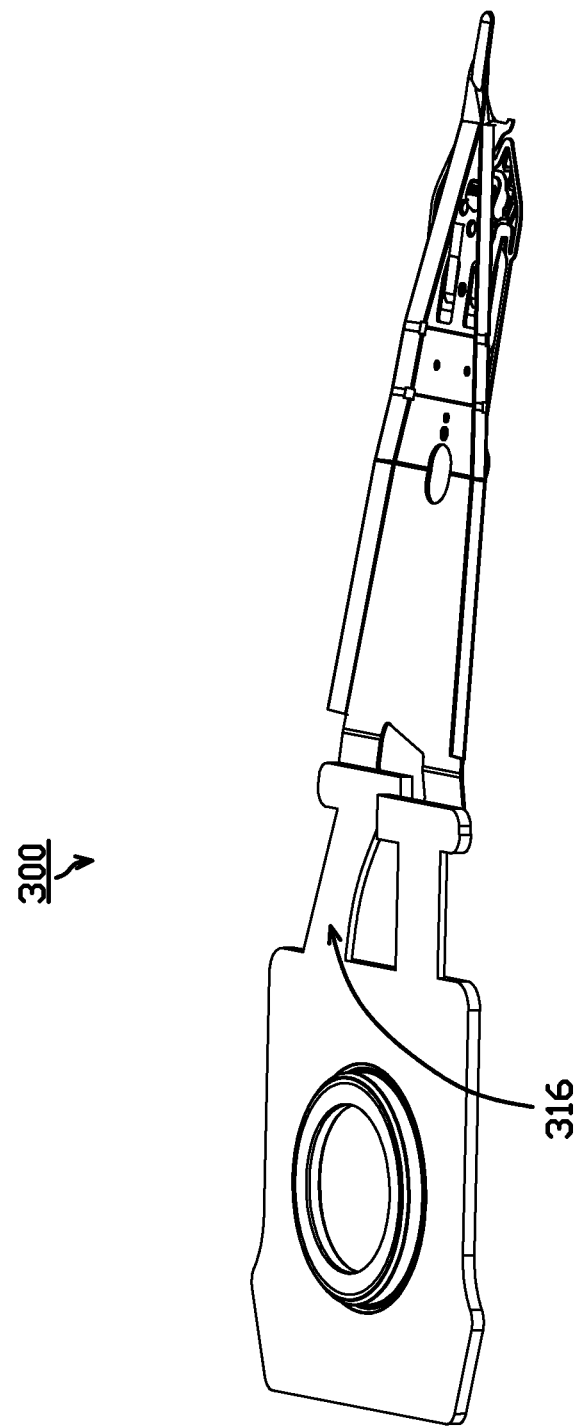
FIG. 3 illustrates a simplified view of the vertical offset of the hinge region of the suspension assembly, according to an embodiment of the present disclosure, when a DC voltage is applied.

FIG. 3 illustrates a simplified view of the vertical offset of the hinge region of the suspension assembly 300 when a DC voltage is applied. Specifically, the suspension assembly 300 is configured to bend at the hinge at one side when the piezoelectric bender is actuated. The piezoelectric bender 316 can include a 4-layer PZT with a total thickness of 60 microns (μm). FIG. 3 illustrates a case study where the bender 316 experienced bending of approximately 8 microns (μm). This allows for approximately 0.2% in countering vertical coupling.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A suspension assembly comprising:
    a load beam, the load beam includes a rigid region and a mounting region of the load beam, the mounting region includes a first set of spring extensions;
    a base plate including two hinge members extending therefrom and a second set of spring extensions connected to the two hinge members, the second set of spring extensions are coupled to the first set of spring extensions of the mounting region of the load beam, coupling the load beam and the base plate;
    a bender solely connected to one of the two hinge members predisposing the rigid region to move from a first position to a second position.

2. The suspension assembly of claim 1, wherein the first and second set of spring extensions extend lengthwise in a range of about 300 microns to about 1000 microns.

3. The suspension assembly of claim 1, wherein the first set of spring extensions has a first length and the second set of spring extensions has a second length, the first length and the second length are equal.

4. The suspension assembly of claim 1, wherein the first and second set of spring extensions are each orientated at a 0° roll angle with respect to a plane defined by a platter, whereby an operating attitude of the load beam is substantially at a 0° roll angle.

5. The suspension assembly of claim 1, wherein the hinge member is a springing metal layer configured to provide a spring relationship between load beam and base plate.

6. The suspension assembly of claim 1, wherein the bender includes lead zirconate titanate.

7. The suspension assembly of claim 1, wherein the bender includes piezoelectric material.

8. The suspension assembly of claim 1, wherein the bender is a 4-layer piezoelectric with a total thickness of 60 microns.

9. The suspension assembly of claim 1, wherein the second set of spring extensions is coupled to the first set of spring extensions by way of laser spot welding.

10. The suspension assembly of claim 1, wherein the load beam includes at least one rail formed along a majority of a length of the rigid region to provide increased stiffness to the load beam.

11. A hard disk apparatus, the apparatus comprising:
    a load beam, the load beam includes a rigid region and a mounting region of the load beam, the mounting region includes a first set of spring extensions;
    a base plate including two hinge members extending therefrom and a second set of spring extensions coupled to the first set of spring extensions of the mounting region of the load beam, coupling the load beam and the base plate;
    a bender solely positioned on one of the two hinge members predisposing the rigid region to move from a first position to a second position;
    a flexure trace gimbal assembly coupled to the load beam;
    a read/write head coupled to the gimbal; and
    a rotating platter.

12. The apparatus of claim 11, wherein the first and second set of spring extensions each are orientated at a 0° roll angle with respect to a plane defined by the rotating platter, whereby an operating attitude of the load beam is substantially at a 0° roll angle with respect to a plane defined by the rotating platter.

13. The apparatus of claim 11, wherein the first and second spring extensions are each flat and orientated at about a 0° roll angle with respect to a plane defined by the rotating platter.

14. The apparatus of claim 11, wherein a rotational speed of the platter is greater than 5,000 rpm.

15. A base plate comprising:
   a first hinge member on a first side, the first hinge member including a spring extension configured to be coupled to a corresponding spring extension of a load beam;
   a second hinge member on the second side of a suspension, the second hinge member including a spring extension configured to be coupled to a corresponding spring extension of a load beam;
   a bender solely attached to either the first hinge member on the first side or the second hinge member on the second side such that the bender and either the first or second hinge member predisposes the load beam to move from a first position to a second position.

16. The base plate of claim 15, wherein the spring extension extends lengthwise in a range of 300 microns to 1000 microns.

17. The base plate of claim 15, wherein the spring extension is orientated at a 0° roll angle with respect to a plane defined by a platter, whereby an operating attitude of the load beam is substantially at a 0° roll angle.

18. The base plate of claim 15, wherein the hinge member are made up of a springing metal layer configured to provide a spring relationship between load beam and base plate.

19. The base plate of claim 15, wherein the bender includes lead zirconate titanate.

20. The base plate of claim 15, wherein the bender includes piezoelectric material.

21. The base plate of claim 15, wherein the bender is a 4-layer piezoelectric with a total thickness of 60 microns.

* * * * *